United States Patent
MacLean et al.

(10) Patent No.: US 6,529,183 B1
(45) Date of Patent: Mar. 4, 2003

(54) MANUAL INTERFACE COMBINING CONTINUOUS AND DISCRETE CAPABILITIES

(75) Inventors: Karon E. MacLean, Palo Alto, CA (US); Golan Levin, San Francisco, CA (US); Scott S. Snibbe, San Francisco, CA (US); William L. Verplank, Menlo Park, CA (US)

(73) Assignee: Interval Research Corp., Palo Alto, CA (US)

( * ) Notice: Subject to any disclaimer, the term of this patent is extended or adjusted under 35 U.S.C. 154(b) by 0 days.

(21) Appl. No.: 09/394,857

(22) Filed: Sep. 13, 1999

(51) Int. Cl.[7] .................................................. G09G 5/00
(52) U.S. Cl. ........................ 345/156; 345/179; 345/702
(58) Field of Search ................................. 345/156, 158, 345/161, 179, 184, 700, 701, 730, 732, 848, 849, 850, 851, 852; 318/560, 561, 568.11; 463/30, 36, 37, 38, 39; 273/236, 237, 238; 341/20, 27, 31, 32, 33; 434/45, 262, 308, 169; 700/264

(56) References Cited

U.S. PATENT DOCUMENTS

| | | | | |
|---|---|---|---|---|
| 5,134,388 A | * | 7/1992 | Murakami et al. ........... | 345/173 |
| 5,185,561 A | | 2/1993 | Good et al. .................. | 318/432 |
| 5,559,412 A | | 9/1996 | Schuler ....................... | 318/561 |
| 5,694,013 A | | 12/1997 | Stewart et al. ............... | 318/561 |
| 5,737,505 A | | 4/1998 | Shaw et al. .................. | 395/119 |
| 5,739,811 A | | 4/1998 | Rosenberg et al. .......... | 345/161 |
| 5,816,823 A | * | 10/1998 | Naimark et al. ............. | 345/156 |
| 5,825,308 A | | 10/1998 | Rosenberg ................... | 341/20 |
| 6,111,577 A | * | 8/2000 | Zilles et al. ................. | 345/701 |

FOREIGN PATENT DOCUMENTS

WO    WO 98/58308    12/1998

OTHER PUBLICATIONS

Fitzmaurice et al., "An Empirical Evaluation of Graspable User Interfaces: towards specialized, space–multiplexed input," CHI–97 Conference on Human Factors in Computing Systems, Mar. 1997.

2 pages from wacom.com World Wide Web site regarding PL–300 and PL–400 pen input device, copyright 1998.

* cited by examiner

Primary Examiner—Steven Saras
Assistant Examiner—Paul A. Bell
(74) Attorney, Agent, or Firm—Van Pelt & Yi LLP

(57) ABSTRACT

A manual interface combines continuous and discrete control and display capabilities. The manual interface can be embodied by combining a haptic interface providing continuous control and display capabilities with one or more of multiple discrete selectors (such as tagged objects) providing discrete control capabilities. The manual interface can provide finer control and a richer sensory experience than is possible with conventional tagged objects. Further, unlike a conventional haptic interface device, the manual interface can provide easily selectable, multiple interactive possibilities.

10 Claims, 5 Drawing Sheets

MANUAL INTERFACE COMBINING CONTINUOUS AND DISCRETE CAPABILITIES

BACKGROUND OF THE INVENTION

1. Field of the Invention

This invention relates to interfaces and, in particular, to a manual interface that combines continuous and discrete control and display capabilities. Most particularly, the invention relates to a manual interface that combines the continuous control and display capability of a haptic interface with the discrete control capability of a discrete selector (such as a tagged object).

2. Related Art

There are a variety of situations in which a person interacts with an environment via an interface. (What can constitute an "environment" and the types of interaction that a person can have with an environment—which typically will depend upon the nature of the environment—are discussed further below.) Herein, each point of interaction between a person and an environment is referred to as an "interface." An interface can be used for input to, and/or output from, the environment. Interface devices can take a variety of forms, such as, for example, visual interface devices (e.g., computer display monitors, televisions, video cameras, LED displays, signal lights), auditory interface devices (e.g., speakers, microphones), haptic interface devices (e.g., joysticks, keyboards, mice) and tagged objects (explained further below).

A haptic interface device can, as well, take a variety of forms, and can be used as an input device and/or an output device. Haptic interface devices can include force feedback interface devices (i.e., devices which display to the kinesthetic sense) and tactile interface devices (i.e., devices which display to the tactile sense). A force feedback interface device enables variation in a force transmitted to the person using the interface device in response to use of the interface device. A tactile interface device displays to other aspects of the sense of touch, such as, for example, texture or temperature. A haptic interface device can also display to both the kinesthetic and tactile senses, i.e., combine the capabilities of a force feedback interface device and a tactile interface device. For example, a force feedback interface device can, with appropriate application of force, also simulate textures (e.g., bumpiness in a surface that is felt through a probe).

FIG. 1 is a block diagram illustrating the functional aspects of a conventional system including a conventional haptic interface device. A haptic interface device 101 communicates with a haptic controller 102 which, in turn, communicates with an environment 103. The haptic interface device 101 can be used to enable a user 104 to effect, via the haptic controller 102, a particular interaction with the environment 103 and/or can provide a haptic sensation to the user 104 in accordance with the interaction with the environment 103. Often, the environment 103 is also displayed to the user 104 via another device (e.g., one or more devices that produce a visual and/or auditory display), though this is not necessary (as indicated by the dashed line in FIG. 1). (A device for providing haptic sensation to a user can also be constructed to provide other types of display to the user, such as a visual and/or auditory display.) The haptic interface device 101, haptic controller 102 and environment 103 can be embodied by any of a variety of appropriate physical devices which can be controlled in a variety of ways. For example, a brake or a computer-controlled motor can be used to selectively apply a force that impedes or augments motion of a knob or handle that a person uses to change the state of a visual display (e.g., move an icon on a display screen or traverse a visual recording).

A haptic interface device is useful in effecting continuous control and display of an environment. However, there can be significant disadvantages in using a haptic interface device for discrete control. For example, use of a haptic interface device to change between discontinuous states of an environment may be confusing in some situations without another display (e.g., a visual display or an audio display) to augment the haptic interface device. Moreover, addition of another display to minimize or eliminate such confusion may undesirably divert the attention of the person using the haptic interface device and, in any event, adds complexity and expense to the overall interface. Additionally, use of a haptic interface device to effect discrete control may be unwieldy in some situations (see, for example, the description with respect to FIG. 6 below), since a haptic interface device may necessitate traversal of a large number of states between a current state and a desired state. Further, a haptic interface device may be an unnecessarily complex and expensive device to effect discrete control. Finally, it may be desirable for a discrete control device to be relatively small and portable: a haptic interface device can be undesirably deficient in this regard.

Another class of interface device, sometimes referred to as a "tagged object" or "tangible user interface (TUI) device" (for simplicity, "tagged object" is used hereinafter to refer to such an interface device), is a physical object, which can be imbued with some degree of computational capability (e.g., a processing device, a memory device), that affects the interaction of a person with an environment in a particular discrete manner in accordance with an identity or a state of the tagged object. Often, the computational capability (if present) is relatively simple. Typically, a tagged object is a relatively small and inexpensive object, and can be portable.

FIG. 2 is a block diagram illustrating the functional aspects of a conventional system including a conventional tagged object. One of multiple tagged objects 201 is selected by a user 204. The tagged object 201 communicates with a set of filters 202 which, in turn, communicate with an environment 203. The selected tagged object 201 causes, via selection of one or more of the filters 203 corresponding to the tagged object 201, the interaction by the user 204 with the environment 203 to be affected in a particular manner. The tagged object 201, filters 202 and environment 203 can be represented by any of a variety of appropriate physical devices which can be controlled in a variety of ways. For example, a block including an electronic identification device can be placed in a corresponding holder that senses the identity of the block and marks a part or parts of a visual recording with the block's identity or locates a part or parts of a visual recording in accordance with the block's identity. Tagged objects and their uses are described in more detail in, for example, "Bricks: Laying the Foundations for Graspable User Interfaces," by G. Fitzmaurice et al., Proceedings of the Conference on Human Factors in Computing Systems (CHI '95), ACM, Denver, May 1995, pp. 442–449; "Tangible Bits: Towards Seamless Interfaces between People, Bits and Atoms," H. Ishii et al., Proceedings of the Conference on Human Factors in Computing Systems (CHI '97), ACM, Atlanta, March 1997, pp. 234–341; "Logjam: a tangible multi-person interface for video logging," J. Cohen et al., The Conference on Human Factors in Computing Systems (CHI '99), Pittsburgh, 1999; and "Bridging Physical and Virtual Worlds with Electronic Tags," R. Want et al., The Conference on Human Factors in Computing Systems (CHI '99), Pittsburgh, 1999, the disclosures of which are incorporated by reference herein.

A tagged object is useful in effecting discrete control of an environment. However, there can be significant disadvantages in using a tagged object for continuous control. For example, a user must sequentially interact with multiple tagged objects to effect continuous control. It may be necessary to use a prohibitively large number of tagged objects to achieve continuous (or even nearly continuous) control. Further, it is typically desirable to effect continuous control by interacting with a single device, rather than with a series of devices. Additionally, it may be difficult or impossible in some situations to achieve an adequately fine degree of control using a tagged object.

Additionally, a tagged object typically only has input capabilities and does not provide feedback (display) regarding a person's interaction with an environment. (This is so because a tagged object is typically a relatively simple portable device, and the addition of display capabilities may introduce undesirable complexity or detrimentally impact the portability of the device.) Thus, a tagged object may not provide as rich an interaction as desired. (However, a tagged object can be augmented to include a device that provides display capability, usually a simple, low power consumption, discrete display device, such as an LED.)

As made clearer by the description below, it would be desirable for an interface to have both continuous and discrete control and display capabilities. In particular, it would be desirable for a manual interface to have both the continuous control and display capability of a haptic interface and the discrete control capability of a tagged object.

SUMMARY OF THE INVENTION

The invention provides a manual interface that combines continuous and discrete control and display capabilities. A manual interface according to the invention can be embodied by combining a haptic interface providing continuous control and display capabilities with one or more of multiple discrete selectors (such as tagged objects) providing discrete control capabilities. A manual interface in accordance with the invention provides finer control and a richer sensory experience than is possible with conventional tagged objects. Further, unlike a conventional haptic interface device, a manual interface in accordance with the invention provides easily selectable, multiple interactive possibilities.

A manual interface device according to the invention can be embodied so that a haptic interface device and one or more discrete selectors can be removably connected to each other. A manual interface device according to the invention can also be embodied so that one or more discrete selectors can be removably connected to another component of the manual interface device or a system with which the manual interface device is associated. In such an embodiment, since the discrete selector(s) and the haptic interface device can be separated from each other, each device can be used for other applications which may not require the functionality of the other device. In particular, the typically relatively expensive and complex functionality of a haptic interface device can be added to the typically relatively simple and inexpensive functionality of a tagged object only when needed or desired. Moreover, haptic functionality (which often is embodied in devices that are—compared to a typical tagged object—relatively large and not particularly portable) can be added to a tagged object without permanently detracting from the portability or small size of the typical tagged object. At the same time, however, a manual interface device according to the invention enables haptic functionality to be added to a tagged object when desired—a heretofore unavailable augmentation of the capabilities of a tagged object. A discrete selector including multiple selection mechanisms can also be embodied so that one or more of the selection mechanisms is removably connectable to the discrete selector.

A manual interface device according to the invention can be embodied so that the discrete selector(s) combined with a haptic interface device are physically distinctive. Similarly, a discrete selector including multiple selection mechanisms can also be embodied so that one or more of the selection mechanisms is physically distinctive. The physical distinctiveness of a discrete selector (or a selection mechanism of a discrete selector) can enable a user of the manual interface device to identify the discrete selector and distinguish the discrete selector from other discrete selectors. Further, the physical distinctiveness of a discrete selector can be implemented so that the physical distinctiveness of the discrete selector viscerally and/or intuitively conveys to a user of the manual interface device one or more characteristics of the manner in which the discrete selector affects the interaction of the person with the environment (i.e., one or more functions of the discrete selector). The use of a physically distinctive discrete selector—and, in particular, one having distinctiveness that viscerally and/or intuitively conveys to a user a function or functions of the discrete selector—can be advantageous because selection of an appropriate or desired discrete selector by a user is facilitated.

A manual interface device according to the invention can be embodied so that the haptic sensation produced by the haptic interface device is transmitted to a user of the manual interface device, either in whole or in part, through a discrete selector. (However, this need not necessarily be the case; the discrete selector can be used just to select a mode of interaction with the environment.) This can be advantageous in some embodiments of a manual interface according to the invention because doing so provides a haptic display that intuitively feels more correct than would otherwise be the case. This can also be advantageous because it enables the discrete selector to be used for navigation through an environment, which may be necessary or desirable to enable the desired user interaction with the environment and/or produce a desired user experience in interacting with the environment.

The discrete selector of a manual interface according to the invention can affect a person's interaction with an environment via the interface in a variety of ways. For example, the discrete selector can cause modification of the haptic sensation produced by the haptic interface device. The discrete selector can also determine a part of an environment with which the person can interact (enable or facilitate user interaction with a part of an environment, or restrict or prevent user interaction with a part of an environment). The discrete selector can also establish a mode of interaction with an environment. The discrete selector can also modify the manner in which a person can input control to, or receive display of, an environment.

The discrete selector can be physically generic or distinctive. Further, the discrete selector can have a fixed or reassignable identity or identities. A reassignable discrete selector is typically physically generic and is particularized (i.e., the discrete selector can be labelled) in a way that corresponds to the assigned identity or identities.

Conversely, typically, though not necessarily, the identity or identities of a generic discrete selector can be reassigned. The identity or identities of a distinctive discrete selector (except for a modular distinctive discrete selector, as described further below) is typically fixed.

The haptic interface device can be any appropriate such device (of which a variety currently exist). It is anticipated that in many applications of the invention a force feedback interface device (either active or passive) will be used. However, a tactile interface device can also be used in a manual interface according to the invention.

Communication among devices of a system or apparatus according to the invention can be accomplished using wired and/or wireless methods and apparatus.

DETAILED DESCRIPTION OF THE INVENTION

The invention provides a manual interface that combines continuous and discrete control and display capabilities, e.g., a manual interface combining a haptic interface providing continuous control and display capabilities with a discrete selector providing discrete control capabilities. Herein, "manual interface" refers to an interface with which a person interacts via the sense of touch. Though, for many embodiments of such an interface, a person's hand(s) will be used to interact with the interface, this is not necessary. A manual interface in accordance with the invention can, in general, be embodied so that any part of a person's body (e.g., a person's foot or feet, a person's head) interacts with the interface. Further, a person may interact with a manual interface according to the invention via other senses (e.g., sight, hearing) in addition to the sense of touch.

Figure 1:
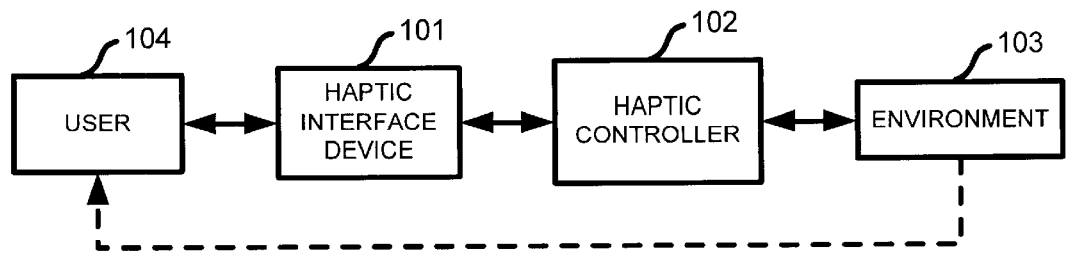
FIG. 1 is a block diagram illustrating the functional aspects of a conventional system including a conventional haptic interface device.
Figure 2:
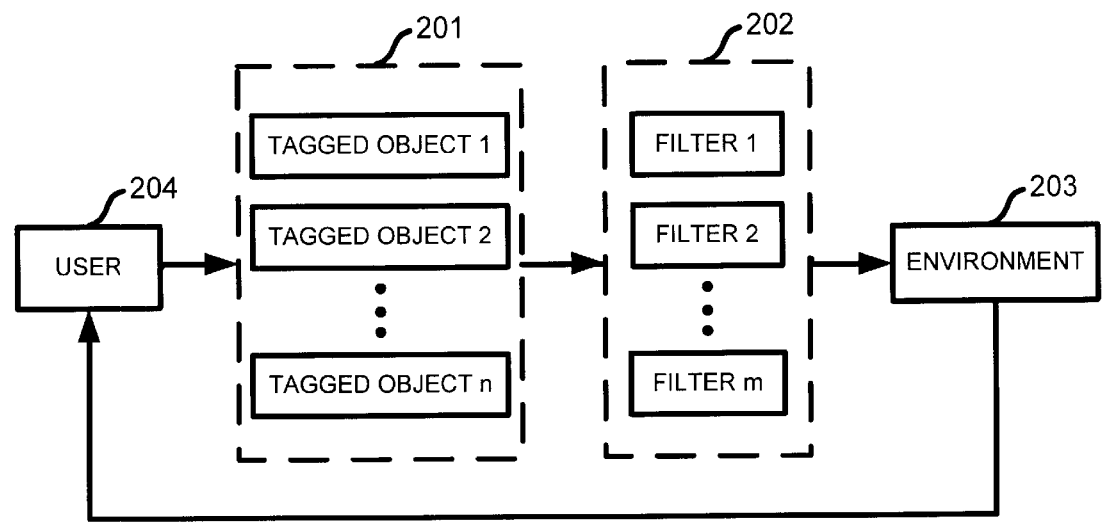
FIG. 2 is a block diagram illustrating the functional aspects of a conventional system including a conventional tagged object.
Figure 3:
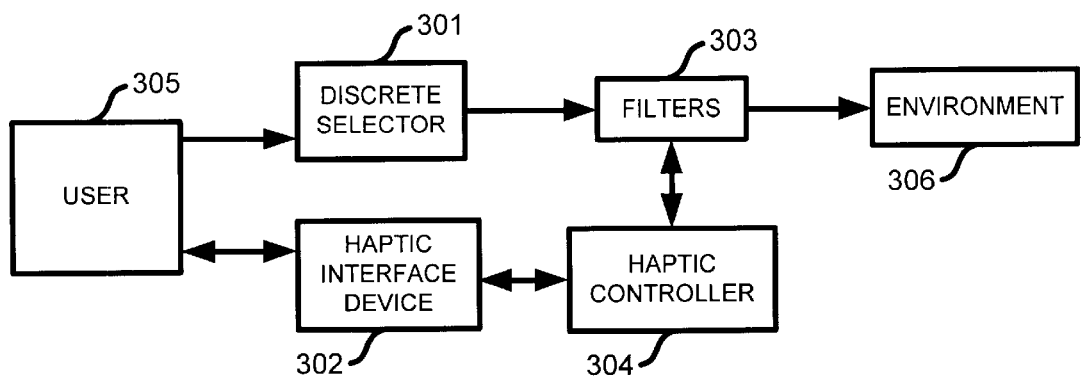
FIG. 3 is a block diagram illustrating a system according to the invention including a manual interface device according to the invention.

FIG. 3 is a block diagram illustrating a system according to the invention including a manual interface device according to the invention. A user 305 uses the manual interface device to interact with an environment 306. As shown in FIG. 3, the manual interface device includes a discrete selector 301 (which can be, for example, a tagged object, as discussed further below) and a haptic interface device 302. The discrete selector 301 is adapted to enable communication with filters 303 (as discussed further below) to enable selection of a predefined set of one or more of the filters 303 that modify the interaction with the environment 306 in a particular way. The haptic interface device 302 communicates with a haptic controller 304 which, in turn, communicates with the environment 306 through the filters 303. As the conventional haptic interface device 101, described above with respect to FIG. 1, the haptic interface device 302 can be used to enable the user 305 to effect a particular interaction with the environment 306 and/or can provide a haptic sensation to the user 305 in accordance with the interaction with the environment 306. However, because communication between the haptic controller 304 and the environment 306 is mediated by the filters 303 (the operative ones of which are selected by the discrete selector 301), the nature of the interaction and/or haptic sensation provided by the haptic interface device 302 is defined, at least in part, by the discrete selector 301. Further, viewed another way, because communication from the environment 306 to the user 305 must occur through the haptic interface device 302, the user's perception of the interaction with the environment 306 specified by the discrete selector 301 is augmented by a haptic sensation provided by the haptic interface device 302.

Those skilled in the art will appreciate that communication among components of the system and the manual interface device shown in FIG. 3 can occur in a manner other than that shown in FIG. 3. For example, communication to and/or from the environment 306 may occur through the haptic controller 304 instead of, or in addition to, through the filters 303. Additionally, as discussed further below, the haptic interface device 302 may transmit the haptic sensation produced by the haptic interface device 302 to the user 305 through the discrete selector 301.

The manual interface device according to the invention shown in FIG. 3 advantageously combines a continuous haptic interface with a discrete selector, enhancing the capabilities of both devices and enabling a single manual interface device to be used for applications in which both discrete and continuous control and display capabilities are needed or desired. A manual interface in accordance with the invention provides finer control and a richer sensory experience than is possible with conventional tagged objects. Further, unlike a conventional haptic interface device, a manual interface in accordance with the invention provides easily selectable, multiple interactive possibilities.

The manual interface according to the invention enables interaction with an environment. As used herein, "environment" refers generally to anything that can be perceived by a user and with which the user can interact via an interface. An environment can be embodied by an apparatus and/or a representation (e.g., an image, sound or smell) produced by an apparatus (e.g., a computational device, and, as appropriate, associated peripheral devices, operating in accordance with one or more computer programs). For example, an environment can be a visual and/or an audio recording, a spreadsheet, a still photographic image, a graphic representation of object(s) or scenes(s) by a computational device and associated display device (e.g., a map, a video game, a graphic representation of a molecular structure, a graphic representation of a mechanical linkage), a vehicle control system (e.g., a clutch, a passenger compartment a climate control system), a home appliance (e.g., an oven, a telephone, a toaster, a coffee grinder, a radio, a stereo, lights, a television, a lawn mower), or an industrial tool (e.g., factory machines, nuclear power plant components). The foregoing list gives an indication of the wide variety of apparatus and representations that can constitute an "environment," and the variety of applications with which a manual interface in accordance with the invention can be used.

Generally, the haptic interface device, haptic controller, discrete selector and filters of a system including a manual interface according to the invention can be embodied by any of a variety of devices known to those skilled in the art. Each of the haptic interface device, haptic controller, discrete selector and filters can be embodied by a separate device or devices. Or, a single device can embody part or all of two or more of the haptic interface device, haptic controller, discrete selector and filters. Ways in which the haptic interface device, haptic controller, discrete selector and filters can be embodied, as well as aspects of the relationships (e.g., communication) among the haptic interface device, haptic controller, discrete selector and filters, are discussed further below.

As described above, haptic interface devices include force feedback interface devices and tactile interface devices: either or both can be used with the invention. Force feedback devices can further be classified as active or passive. Both active and passive force feedback devices can be used with the invention. An active force feedback device is one in which the feedback can supply energy to the user in addition to that supplied by the user to the device. Illustratively, active force feedback devices commonly include a motor, solenoid, or hydraulic or pneumatic actuator which, under control of a computational device, applies a force to the user which varies in response to input to the active force feedback device (which can be sensed by a conventional position and/or force sensor) and/or interaction by the user with the environment to which the active force feedback device interfaces. A passive force feedback device is one which can only dissipate energy produced by the user. A passive force feedback device operates in a manner similar to that of an active force feedback device, except that the force is varied by an energy dissipating device, such as a brake. A hybrid of such force feedback devices—a "parasitic" force feedback device—can also be used. As used herein, a "parasitic" force feedback device stores energy supplied by the user to the device, then supplies some or all of the stored energy back to the user at a later time. Tactile interface devices such as a thermally-controlled or a moisture-controlled surface or air volume can also be used with the invention.

A haptic controller for use with the invention can be embodied by a variety of conventional apparatus, in view of the characteristics of the haptic interface device (and other components of the manual interface or the environment, if appropriate), as known to those skilled in the art. The haptic controller may or may not be integrally formed with the haptic interface device.

A discrete selector for use with a manual interface device according to the invention can also be embodied by a variety of apparatus. In particular, as will be better appreciated from the description below, a discrete selector can be embodied, in whole or in part, by multiple physically separate devices (each of which alone can also be referred to as a discrete selector), each of which can enable a user's interaction with an environment to be modified in one or more ways, or a discrete selector can be embodied by a single device including multiple selection mechanisms that each enable a user's interaction with an environment to be modified in a particular way. As an example of the former implementation, it is anticipated that multiple tagged objects (as described above and in more detail below) can advantageously be used to embody a discrete selector. (Below, aspects of a discrete selector are sometimes described with respect to an implementation of a discrete selector using tagged objects; those skilled in the art will appreciate how to implement those aspects of a discrete selector, in view of the description below, when a discrete selector is implemented using other apparatus.) As an example of the latter implementation, a discrete selector can be embodied by a device including multiple electronic and/or mechanical switches or multiple "handles" (see, e.g., FIGS. 8A, 8B and 8C, described below), each of which is identified to indicate the manner in which activation of the switch or grasping of the handle affects the user's interaction with the environment.

As indicated above, a tagged object is a physical object that affects the interaction of a person with an environment in a particular discrete manner in accordance with an identity or state of the tagged object. Any appropriate tagged object can be used with the invention. A tagged object can function as a "data-container" type tagged object, either storing or causing to be stored data representing, for example, an aspect of the environment, a state of the environment or an aspect of the user's interaction with the environment. A tagged object can also function as a "tool" type tagged object, either effecting or causing to be effected, for example, a particular modification of the environment, selection of a particular part of the environment with which to interact, or restriction of the manner in which the user can interact with the environment. A tagged object is often imbued with some degree of computational capability. Many tagged objects, for example, are simple devices having the capability to do little or no more than store an identity and communicate that identity to a device external to the tagged object. In many applications of the invention, simple tagged objects of this type are adequate to provide the desired functionality. However, tagged objects having more complex computational capability can also be used and may be desirable for some applications. For example, a tagged object can be implemented so that, in addition to storing and transmitting an identity of the tagged object, the tagged object stores and can transmit data and/or instructions that can be used in modifying the interaction with the environment. As indicated above, a tagged object can also be implemented to cause storage of data in response to interaction with the environment. A tagged object may also be implemented so that a user can interact with the tagged object to select one of multiple identities or states associated with the tagged object, each identity or state affecting the user's interaction with the environment in a particular manner.

A discrete selector (or the selection mechanisms of a discrete selector, such as handles) can be generic or distinctive. The following description regarding distinctive and generic discrete selectors applies as well to the selection mechanisms of a discrete selector.

For example, a discrete selector can be physically distinctive. The identity of a physically distinctive discrete selector is conveyed to a user by the physical distinctiveness of the discrete selector. Physical distinctiveness of a discrete selector can be conveyed visually (i.e., the discrete selector has a distinctive appearance). For example, a discrete selector can have a distinct shape, size and/or color. Physical distinctiveness of a discrete selector can also be conveyed tactilely (i.e., the discrete selector has a distinctive feel). For example, a discrete selector can have a distinct compliance (e.g., "squishiness") and/or texture. It may also be possible to convey the physical distinctiveness of a discrete selector via the other senses (i.e., hearing, smell, taste). (Physical distinctiveness of a discrete selector can also be conveyed by physical characteristics appealing to a combination of senses.) The physical distinctiveness of a discrete selector can advantageously be implemented so that the physical distinctiveness of the discrete selector viscerally and/or intuitively conveys to a user of the manual interface device one or more characteristics of the manner in which the discrete selector affects the interaction of the person with the environment (i.e., one or more functions of the discrete selector). (See, for example, FIGS. 5 and 7—and the associated description below—which depict discrete selectors which are visually and tactilely distinctive.) The use of a physically distinctive discrete selector—and, in particular, one having distinctiveness that viscerally and/or intuitively conveys to a user a function or functions associated with the discrete selector—can be advantageous because selection of an appropriate or desired discrete selector by a user is facilitated. When the haptic sensation is provided through the discrete selector (as discussed elsewhere herein), the use of a physically distinctive discrete selector can also enhance the perception of the haptic sensation (see, e.g., FIG. 5 and the associated description below).

A discrete selector can be distinctive in other ways. For example, a discrete selector can include multiple selection mechanisms, each of whose identity is conveyed to a user by the position of the selection mechanism on the discrete selector. (In general, "position" can include location and/or orientation.) Such a discrete selector can take advantage of muscle memory, enabling a user, after a period of use of the discrete selector, to instinctively know how to find a particular selection mechanism without looking (which can be advantageous whether or not the selection mechanisms are physically distinctive), or, correspondingly, to know which selection mechanism has been selected based on the position of the selected selection mechanism (which can be particularly advantageous when the selection mechanisms are not physically distinctive). Such a discrete selector can, as a result, be advantageous for use in situations in which it is difficult or impossible for the user to see the discrete selector (e.g., when it is dark). A discrete selector of this type need not require the selection mechanisms to be physically prominent; different selection mechanisms can be represented by different regions of a surface. A discrete selector of this type can be a wheel that is implemented such that touching of a particular section (relative to a fixed reference) of the outer circumference of the wheel (e.g., the top, bottom, left or right circumferential surface of the wheel) by a user is sensed and causes activation of a corresponding selection mechanism (see FIG. 10, described below). (Note that, depending on the rotation of the wheel, any part of the wheel surface may be touched to activate a particular selection mechanism.) Or, a discrete selector of this type can be a flat surface that is implemented such that touching of a particular area of the surface by a user is sensed and causes activation of a corresponding selection mechanism.

Since the appearance of a generic discrete selector does not convey the identity of the discrete selector to a user, a generic discrete selector is often labelled (i.e., an identifier is attached or mounted to the discrete selector) in some way to establish the identity of the discrete selector to a user. (In some applications of the invention, the generic discrete selector may be unlabelled, the identity of the discrete selector being conveyed to a user via a display device to which the identity of the discrete selector has been communicated.) Such labelling may be accomplished by affixing an alphanumeric designation to the discrete selector. Or, a generic discrete selector can be labelled by mounting on the generic discrete selector a physically distinctive object which, like the physical distinctiveness of a distinctive discrete selector, conveys the identity of the discrete selector (and, perhaps, one or more characteristics of the associated modification of the user interaction with the environment). A generic discrete selector labelled in the latter way can also be described as a "modular distinctive discrete selector."

A discrete selector (or the selection mechanisms of a discrete selector, such as handles) can have a fixed or reassignable identity. (The following description regarding fixed and reassignable identities of a discrete selector applies as well to selection mechanisms of a discrete selector.) A reassignable discrete selector typically is physically generic and is particularized (i.e., labelled, as described above) in a way that corresponds to the assigned identity. Typically, the identity of a generic discrete selector can be reassigned. (However, this need not necessarily be the case; for example, a generic discrete selector can be implemented with a non-erasable programmable computational device, e.g., PROM, that does not allow the identity of the generic discrete selector to be changed once established.) The identity of a distinctive discrete selector (except for a modular distinctive discrete selector, as described above) is typically fixed.

In some embodiments of a manual interface according to the invention, a discrete selector can be removably connected to (e.g., attached to or mounted on) a haptic interface device or another component of the manual interface device or a system with which the manual interface device is associated. Such embodiments of the invention can enable both the discrete selector and the haptic interface device to be used alone for other applications that may not require the functionality of the other device. Such embodiments of the invention can also enable a discrete selector to be used with multiple different haptic interface devices, and different discrete selectors to be used with a haptic interface device. A tagged object (an advantageous instantiation of a discrete selector), as discussed above, is typically a simple, inexpensive device that is also typically small and portable. (A tagged object can be constructed using a simple electronic identification device that costs pennies to manufacture, making tagged objects relatively disposable.) A haptic interface device, on the other hand, is typically a much more complex and expensive device than a tagged object, and is typically larger and less portable. Embodiments of the invention in which a discrete selector can be removably connected to a haptic interface device or another component of the manual interface device or associated system enable haptic functionality to be added to a tagged object (or other type of discrete selector) without permanently burdening the tagged object with the complexity, expense, size and relative unwieldiness of a haptic interface device, which may be particularly undesirable if it is intended that the tagged object frequently be used for applications in which haptic functionality is of little or no use. Such embodiments of the invention can also enable multiple instantiations of haptic functionality to be produced, for any of a variety of haptic interface devices and for haptic interface devices at different locations, without necessitating production of a large number of different haptic interface devices or relocation of haptic interface devices. Similarly, such embodiments of the invention enable multiple instantiations of interaction by a user with an environment using a single haptic interface device.

There are many ways in which removable connection of a discrete selector to a haptic interface device or other device can be effected. Any of a variety of ways of mechanically attaching or mounting can be used. It may be desirable to attach or mount the discrete selector so that, in normal use of the manual interface according to the invention, the user grasps the discrete selector. (For some applications—see FIG. 5 and accompanying description below—such attachment or mounting may be necessary in order to fulfill the intended use of the manual interface.) Additionally, the particular manner of attachment or mounting used may depend on the physical characteristics (e.g., size, shape) of the discrete selector and haptic interface device or other device to which the discrete selector is connected. Illustratively, a discrete selector can be plugged into, snapped onto, or screwed in another device, or attached to another device with Velcro™. A discrete selector can also be inserted in an opening (e.g., slot, hole) in another device. If not mechanically connected to the haptic interface device, the discrete selector is typically mechanically connected to some other component of a manual interface according to the invention (e.g., a receptacle or tray provided for the discrete selector). Further, in such case, it may be desirable that the discrete selector be located proximate (e.g., within several feet) to the haptic interface device, so that, for example, a user can readily substitute one discrete selector for another while continuing to use the manual interface device. It is emphasized that the above-described ways of removably connecting a discrete selector to a haptic interface device or other device are only illustrative.

As indicated above, a discrete selector can be embodied as a single device including multiple selection mechanisms (e.g., handles or switches). (An embodiment of the invention in which a discrete selector includes multiple handles is described below with respect to FIGS. 8A, 8B and 8C.) Such a discrete selector can be implemented so that the selection mechanisms of the discrete selector are removably connected to a body of the discrete selector. (Such a discrete selector can also be implemented so that the discrete selector can be removably connected to the rest of the manual interface device or a part of a system with which the manual interface device is used.) The removable connection of selection mechanisms of a discrete selector can be accomplished in the same manner as discussed above with respect to the removable connection of a discrete selector itself.

The discrete selector can also be permanently attached to the haptic interface device or other part of a manual interface device according to the invention or system associated therewith. The selection mechanisms of a discrete selector can also be permanently attached to the discrete selector. Any appropriate manner of effecting permanent attachment, as can readily be appreciated by those skilled in the art, can be used. It is anticipated that permanent attachment of a discrete selector will most often be used for discrete selectors that include multiple selection mechanisms. While, as indicated above, the selection mechanisms of such a discrete selector can be permanently attached to the discrete selector, it can be advantageous to implement the discrete selector so that one or more of the selection mechanisms are removably connectable to the discrete selector, thus enabling such selection mechanisms to be replaced with new selection mechanisms.

A manual interface device according to the invention can also be implemented so that the discrete selector does not contact at all the other components of the manual interface device or an associated system. An identity or state of the discrete selector can be communicated to the manual interface device (in particular, the filters) using a wireless communication method (examples of which are discussed further below). For example, in one implementation of such a manual interface device according to the invention, a physically distinctive tagged object can be passed through the field of view of an optical recognition system to convey the identity of the tagged object to the rest of the manual interface device.

As indicated above, the haptic sensation produced by a haptic interface device of a manual interface device according to the invention can be transmitted to a user of the manual interface device, either in whole or in part, through a discrete selector. For example, if the haptic sensation is created by application of a force to the user, the force can be applied by the haptic interface device to the discrete selector, which, in turn, provides the force to the user. Providing the haptic sensation through the discrete selector can be advantageous in some embodiments of a manual interface according to the invention because doing so provides a haptic display that intuitively feels more correct than would otherwise be the case. This can also be advantageous because it enables the discrete selector to be used for navigation through an environment, which may be necessary or desirable to enable the desired user interaction with the environment and/or produce a desired user experience in interacting with the environment (see, e.g., FIG. 5 and the associated description below).

A manual interface according to the invention can be implemented to enable multiple discrete selectors to be used (activated) simultaneously. (Similarly, a discrete selector including multiple handles can also be implemented so that multiple handles of the discrete selector can be activated simultaneously.) Those skilled in the art can understand, in view of the description herein, how to modify a manual interface adapted to enable use of a single discrete selector to produce a manual interface adapted to enable simultaneous use of multiple discrete selectors, e.g., how to enable connection of multiple discrete selectors, how to enable communication from multiple discrete selectors to a set of filters, how to mediate and integrate operation of multiple filters at the same time.

In general, a discrete selector of a manual interface device according to the invention is used to effect input from the user. However, a manual interface device according to the invention can include display apparatus added to a discrete selector. For example, a tagged object that enables accumulation of data on a data storage device can have apparatus added thereto that indicates how much data is stored on the data storage device, or how much data storage capacity of the data storage device has been used and/or remains to be used. Or, for example, a discrete selector can include one or more LEDs that can be selectively activated to indicate status information (e.g., a selected mode) regarding the discrete selector. In general, any appropriate display apparatus can be added to a discrete selector of a manual interface according to the invention.

The filters of a system according to the invention can be embodied in any appropriate device or devices. Typically, the filters are embodied in a computational device or devices operating in accordance with appropriate software. A filter or filters can be embodied in a device together with a discrete selector. "Filter," as used herein, encompasses any means of constraining or defining the user's interaction with the environment. Thus, for example, a filter can modify, typically in a predetermined manner, a haptic sensation produced by the haptic interface device (e.g., change the number of detents perceived by a user for a given distance of travel of a part of a manual interface device according to the invention with which the user interacts). (A filter can also modify the manner in which a user receives non-haptic display of an environment.) A filter can also permit the user to interact with a specified subset of the environment (e.g., specified video frames from a video recording, a specified collection of audio tracks from an audio recording, or a specified part of a database). Or, a filter can enable a user to a select a specified mode of interaction with an environment (e.g., use a particular drawing implement with a computer drawing program). A filter can also modify the manner in which a user can input control to an environment (e.g., zoom control for a display of a visual recording). Another way in which a filter can modify interaction with an environment is by signalling the imminent occurrence of, or facilitating location of, particular content in an environment, the presence of which can be determined automatically (using known techniques, either in real-time during the interaction or prior to the interaction) or manually (via analysis of annotations entered by a user before the current interaction with the environment). For example, a filter may signal to a parent the presence of, or imminent display of, obscene or violent content, so that the parent can take appropriate action to prevent interaction with such content while a child is present. Or, a filter may identify the imminent display of a commercial so that the user can skip the display of the commercial. Or, a filter may identify content including a person or event of great or no interest, so that the user can take appropriate action regarding the display of such content. The foregoing are some illustrations of the manner in which filters can modify a user's interaction with an environment. The examples described below of particular applications in a which a manual interface according to the invention is used (see FIGS, 4, 5, 6, 7, 8A, 8B and 8C) further illustrate ways in which filters can be defined and used.

Communication among, or input to, the components of a system or apparatus according to the invention can be accomplished in any appropriate manner: a variety of conventional communication apparatus and methods can be used. Further, wired or wireless communication apparatus and methods can be used. For example, the following apparatus and/or methods can be used to identify and communicate the identity or state of a discrete selector to the filters: magnetic stripe readers, bar code readers, RFID communication, radiofrequency communication, infrared sensors, ultrasonic sensing systems, optical recognition systems, magnetic field sensing systems, resonance sensing systems. Input to a discrete selector can be implemented using, for example, analog or digital switch circuits, touch sensors, touch or proximity sensing using optical sensors, capacitive sensing circuits, force sensitive resistors, and other conventional force and proximity sensing methods.

There are many applications in which a manual interface according to the invention can advantageously be used. Below, several examples of such applications are described. It is to be understood that these examples are merely illustrative, presented to give an indication of the range of usefulness of a manual interface according to the invention.

Figure 4:
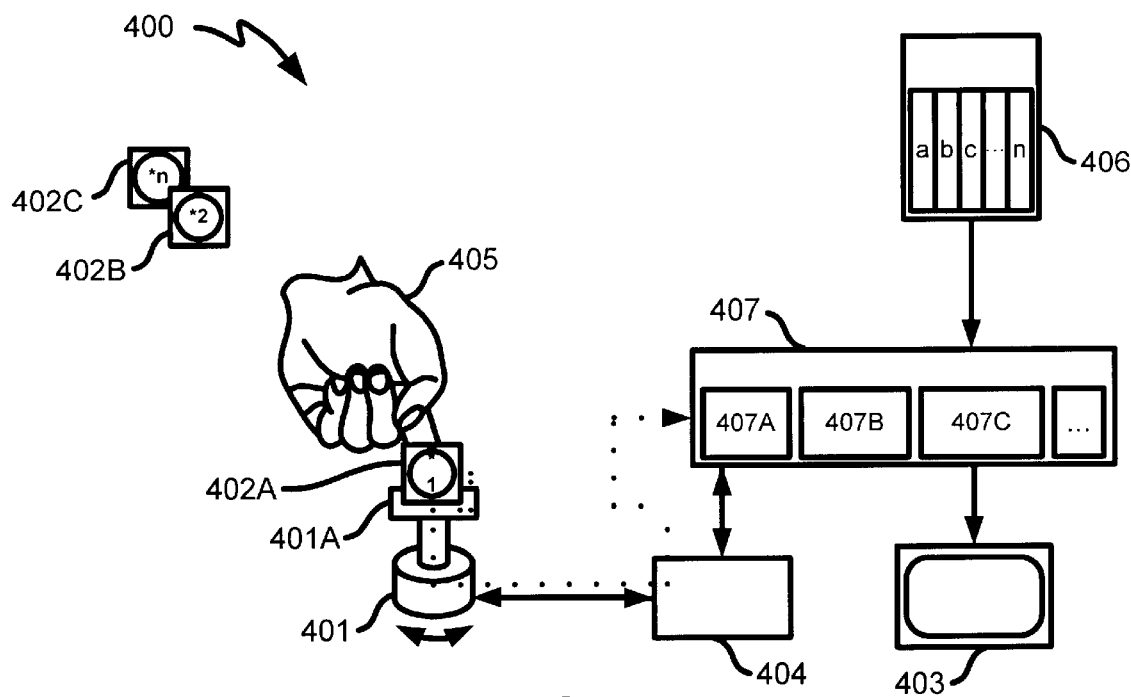
FIG. 4 is a diagram of an exemplary embodiment of a system according to the invention.

FIG. 4 is a diagram of an exemplary embodiment of a system according to the invention. In FIG. 4, a video editing and/or navigation system 400 is illustrated. A haptic interface device 401 enables control via a haptic controller 404 of the display of a visual recording on a visual display device 403. (An analogous system could be used for editing and/or navigating an audio recording.) The visual recording is represented by a database stored on a data storage device 406 that, as illustrated in FIG. 4, is partitioned into n segments (e.g., frames of video data). As illustrated in FIG. 4, the haptic interface device 401 includes a knob 401a that can be rotated by a user 405 to move back and forth through the visual recording (i.e., through the frames of video data). The haptic interface device 401 (under control of the haptic controller 404) can be, for example, a force feedback device that provides a force to the user 405 in response to the content of the visual recording. For example, at each transition between video frames, a brief duration of resistance to the user's rotation of the knob 401a can be generated (either passively or actively), thus simulating a detent between frames. The construction and operation of embodiments of a system as so far described with respect to FIG. 4, as well as the ways in which a force provided by a haptic interface device can be dependent on the content of a visual recording, are explained in more detail in commonly owned U.S. Pat. No. 5,816,823, issued to Michael Naimark et al. on Oct. 6, 1998, and entitled "Input Device and Method for Interacting with Motion Pictures Incorporating Content-Based Haptic Feedback," the disclosure of which is incorporated by reference herein. Other examples of the production of a haptic sensation (e.g., force feedback) in response to the content of a video recording are also discussed therein.

One of a set of tagged objects 402a, 402b and 402c can be connected to the haptic interface device 401 by, for example, inserting the tagged object 402a, 402b or 402c into a slot formed in the knob 401a of the haptic interface device 401. (In FIG. 4, the tagged object 402a is connected to the haptic interface device 401.) Each particular tagged object 402a, 402b and 402c includes an electronic identification device (or can otherwise communicate the identity of the tagged object 402a, 402b and 402c). When the tagged object 402a, 402b or 402c is connected to the haptic interface device 401, one or more of a set of filters 407 is activated so that the user's interaction with the visual recording is modified in a particular way. (As illustrated in FIG. 4, when connected to the haptic interface device 401, the tagged object 402a, 402b or 402c communicates with the filters 407 through the haptic interface device 401 and the haptic controller 404. However, as described above, this need not necessarily be the case; the tagged object 402a, 402b or 402c could, for example, communicate directly with the filters 407.) A set of tagged objects (e.g., the tagged objects 402a, 402b and 402c) can represent different modifications of the user interaction that are all of the same particular type (each different modification of a particular type being represented by a particular one or more of the filters 407). For example, a filter 407a (and other similar filters, not shown in FIG. 4) can select a set of video frames (e.g., a set of contiguous video frames covering a specified duration of time, referred to herein as a "video clip") for display by the visual display device 403. Or, a filter 407b (and other similar filters, not shown in FIG. 4) can select video frames for display that have been marked in a specified manner (e.g., marks that indicate the presence of a particular type of content, marks that were created by a particular person). (In the foregoing two examples, the haptic sensation can be, for example, the simulation of a detent between each frame of the selected set of video frames.) Or, a filter 407c (and other similar filters, not shown in FIG. 4) can modify the haptic sensation (e.g., force) in a particular way (e.g., change the magnitude or character of the force). (This might be done, for example, to provide a haptic sensation tailored to each user of the system 400.) Another possibility is for each of a set of filters to cause each occurrence of one or more marks to produce a particular type of haptic sensation (e.g., detents between frames, changing viscosity with speed of movement through frames of the visual recording). Still another possibility is for each of a set of filters to modify characteristics of operation of the system 400 (e.g., speed with which the visual recording changes in response to rotation of the knob 401a). (Again, the haptic sensation can be, for example, the simulation of detents between video frames.) Yet another possibility is for each of a set of filters to allow operation of the system 400 only in a particular mode (e.g., view, edit, zoom). (Again, this might be done, for example, to tailor operation of the system 400 to particular users.) Still another possibility is for each of a set of filters to enable change in a characteristic (e.g., brightness adjustment, focus adjustment) of the display of the visual recording. (In the last two examples, the haptic sensation can be, for example, the simulation of viscosity when the user makes control changes, the viscosity changing in accordance with changes in user control and/or the manner in which user control is effected.) As can be appreciated, there are many other possibilities.

The characteristics of a related set of discrete selectors can depend on the type of modification produced by those discrete selectors. For example, in the video editing and/or navigation system 400, when each tagged object is used to select a particular video clip, it may be desirable to use tagged objects that have reassignable identities and a generic appearance, so that a relatively small set of tagged objects can be used to specify a relatively large variety of different sets of video clips within a visual recording or to specify sets of video clips in many different visual recordings. Or, for example, when each tagged object is used to select a mode of operation of the system 400, since the number of modes will typically be relatively small and will typically remain the same for each visual recording, it may be desirable to use tagged objects that are physically distinctive (e.g., a distinctive shape of the portion of the tagged object to be held by the user) and are not reassignable, so that the appropriate tagged object can readily be identified by a user (if the tagged objects have distinctive shapes, perhaps without looking).

Figure 5:
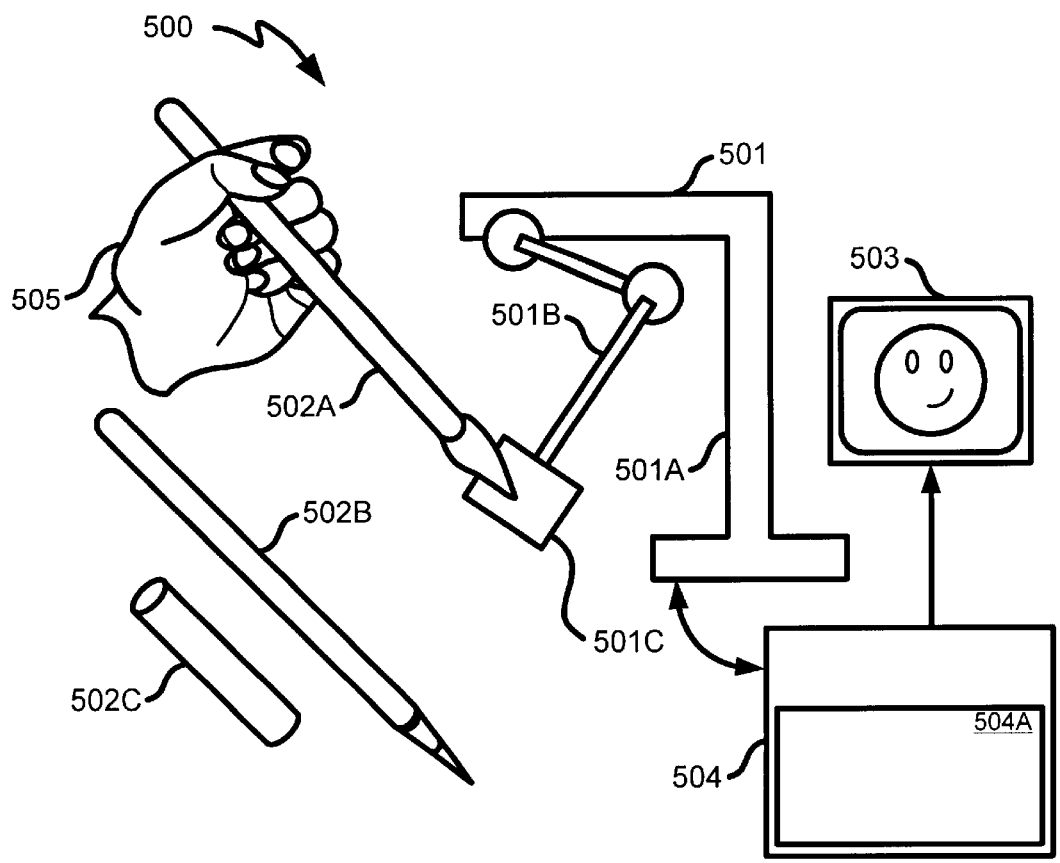
FIG. 5 is a diagram of another exemplary embodiment of a system according to the invention.

FIG. 5 is a diagram of another exemplary embodiment of a system according to the invention. In FIG. 5, a drawing system 500 is illustrated. A haptic interface device 501, together with one of a set of tagged objects 502a, 502b or 502c, enables a user 505 to create an image on a visual display device 503. The haptic interface device 501 includes a base 501a, an actuated hinge system 501b (which provides the haptic display) and a receptacle 501c. The hinge system 501b can be constructed to allow motion of the receptacle 501c in three dimensions (e.g., the upper hinge, as illustrated in FIG. 5, can allow motion in the plane of FIG. 5, while the lower hinge can allow motion in a plane perpendicular to the plane of FIG. 5). The haptic interface device 501 can be embodied, for example, by a Phantom™ device, made by Sensable Technologies, Inc., located in Cambridge, Mass. One of the tagged objects 502a, 502b or 502c is connected to the haptic interface device 501 by inserting the tagged object 502a, 502b or 502c into the receptacle 501c of the haptic interface device 501. (In FIG. 5, the tagged object 502a is connected to the haptic interface device 501.) Each particular tagged object 502a, 502b and 502c includes an electronic identification device (or can otherwise communicate the identity of the tagged object 502a, 502b and 502c). The haptic interface device 501 (under control of a computer 504) can provide a force (in one or more of the three dimensions of motion) to the user 505 in response to movement of the receptacle 501c and/or the identity of the tagged object 502a, 502b or 502c inserted into the receptacle 501c.

Each tagged object 502a, 502b or 502c can correspond to a particular type of writing implement. In particular, each tagged object 502a, 502b and 502c can have the physical characteristics (e.g., shape, weight, surface texture) of that type of writing implement (such a physically representational object is sometimes referred to as a "phicon"). (The drawing system 500 is an example of an application of the invention in which it is particularly advantageous to use discrete selectors having physical distinctiveness—in particular, physical distinctiveness which viscerally and/or intuitively conveys a function or functions of the discrete selectors—and, perhaps, non-reassignable identities.) As illustrated in FIG. 5, for example, the tagged object 502a is a brush, the tagged object 502b is a pencil, an the tagged object 502c is a piece of chalk. (agged objects for use with the system 500 can also represent a particular instantiation of one type of writing implement, e.g., different brushes or pencils having different characteristics.) A database 504a including data representing characteristics corresponding to each of the tagged objects 502a, 502b and 502c is stored by the computer 504. Communication of the identity of the tagged object 502a, 502b or 502c to the computer 504 (either directly from the tagged object 502a, 502b or 502c, or indirectly via the haptic interface device 501) can cause the computer 504 to modify the experience of creating the image and/or the characteristics of the produced image in accordance with the identity of the tagged object 502a, 502b or 502c. (In the system 500, the functions of the haptic controller 404, the data storage device 406 and the filters 407 of the system 400 are all performed by the computer 504.) For example, the haptic sensation (e.g., force feedback) provided to the user 505 by the haptic interface device 501 can be tailored so that use of a particular tagged object 502a, 502b or 502c provides a haptic sensation to the user 505 that simulates the haptic sensation that would be felt if the user 505 was using a writing implement of the type that the tagged object 502a, 502b or 502c represents. Additionally, the characteristics of the image created on the visual display device 503 (e.g., line thickness, line texture) can be modified in accordance with the identity of the tagged object 502a, 502b or 502c to reflect the characteristics of an image that would be produced by the actual writing implement of the type that the tagged object 502a, 502b or 502c represents.

As described above, a manual interface according to the invention can be implemented so that multiple discrete selectors can be used simultaneously. The drawing system 500 is an example of an application in which such an implementation can be particularly advantageous. For example, a second tagged object could be connected to the haptic interface device 501 to specify a writing medium (e.g., a particular type of paper, a canvas), further modifying the experience of creating the image (e.g., the haptic sensation produced generally by writing on a particular medium, as well as the haptic sensation produced by interaction of a particular writing implement with a particular medium) and/or the characteristics of the produced image.

A manual interface device and associated system according to another embodiment of the invention can implemented in a manner that is the same as, or similar to, that described above with respect to the drawing system 500 depicted in FIG. 5. In this embodiment of the invention, the manual interface device and associated system enable a user to use a surgical tool to interact with a "surgical environment" (e.g., a part of the human body). The tagged objects for such an embodiment of the invention can be different surgical tools (e.g., scalpel, forceps, endoscopic tube). Each tagged object can have the physical characteristics (e.g., shape, weight, surface texture) of that type of surgical tool. The haptic sensation (e.g., force feedback) provided to the user by the haptic interface device can be tailored so that use of a particular tagged object provides a haptic sensation to the user that simulates the haptic sensation that would be felt if the user was using a surgical tool of the type that the tagged object represents in the particular surgical environment with which the user is interacting. Such an embodiment of the invention can be advantageously used to facilitate the use of teleoperated systems for remote surgery (e.g., laparoscopic surgery). Or, such an embodiment of the invention can be advantageously used to enable training in surgical procedures.

Figure 6:
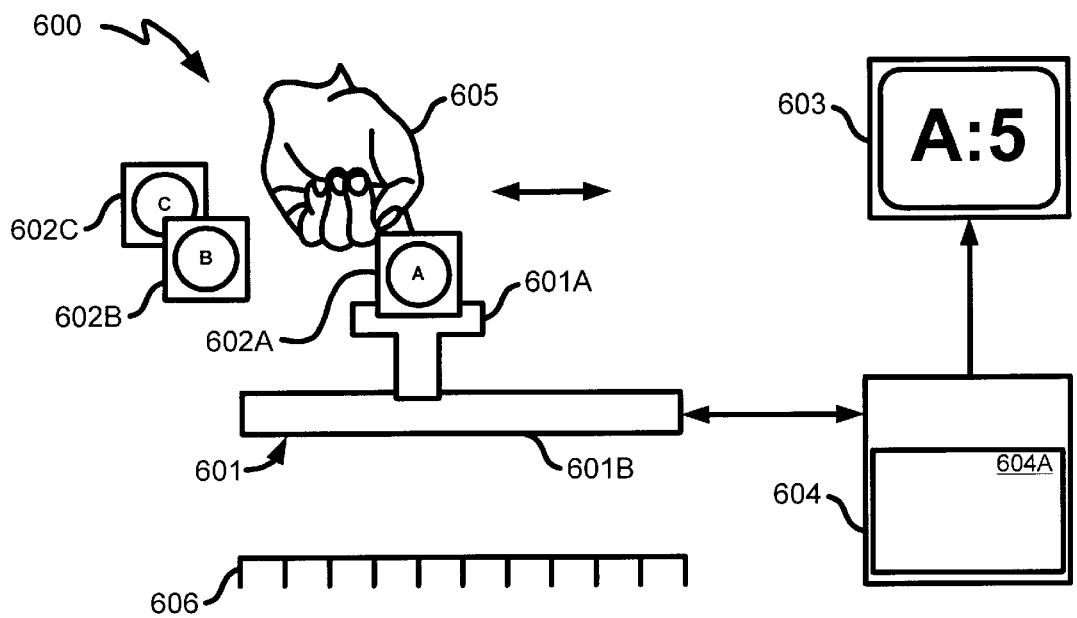
FIG. 6 is a diagram of yet another exemplary embodiment of a system according to the invention.

FIG. 6 is a diagram of yet another exemplary embodiment of a system according to the invention. In FIG. 6, a slide presentation system 600 is illustrated. A haptic interface device 601 enables a user 605 to selectively display slides (i.e., still photographs) on a visual display device 603. As illustrated in FIG. 6, the haptic interface device 601 includes a handle 601a that a user can slide along a base 601b to move back and forth through a set of multiple slides. The haptic interface device 601 (under control of a computer 604) can be, for example, a force feedback device that provides a force to the user 605 in response to the slide display. For example, at each transition between slides, a brief duration of resistance to the user's movement of the handle 601a can be generated (either passively or actively), thus simulating a detent between slides. The numeral 606 indicates a graphical representation of the position of the slides (each vertical line represents a slide) along the base 601b of the haptic interface device 601 for a set of slides including eleven slides.

A database 604a including data representing multiple sets of slides is stored by the computer 604. One of a set of tagged objects 602a, 602b and 602c can be connected to the haptic interface device 601 by, for example, inserting the tagged object 602a, 602b or 602c into a slot formed in the handle 601a of the haptic interface device 601. Each tagged object 602a, 602b or 602c includes an electronic identification device (or can otherwise communicate the identity of the tagged object 602a, 602b and 602c) that identifies a set of slides (which will typically include different numbers of slides) stored by the computer 604, so that, when the tagged object 602a, 602b or 602c is connected to the haptic interface device 601, the identity of the tagged object 602a, 602b or 602c is communicated to the computer 604 (either directly or indirectly), thereby causing the corresponding set of slides to be displayed by the visual display device 603. (In FIG. 6, the tagged object 602a is connected to the haptic interface device 601, so that a set of slides designated by the letter "A" is being shown. As illustrated in FIG. 6, the fifth of the eleven slides is being displayed.) In a slide presentation system, it may be desirable to use discrete selectors that have reassignable identities and a generic appearance, so that a relatively small set of discrete selectors can be used to specify any of a large number of different sets of slides. The haptic sensation produced by the haptic interface device 601 changes in accordance with the selected set of slides. For example, the number of detents and the location of the detents along the base 601b can change to reflect the number of slides in a set of slides.

The use of the haptic interface device 601 to produce detents between slides can be very useful in controlling a slide display, particularly when the number of slides is large relative to the maximum distance of travel of the handle 601a of the haptic interface device 601, since it may otherwise be difficult for the user 605 to produce the fine control necessary to accurately position the handle 601a to display a desired slide. The use of a haptic interface device is also preferable to use of multiple tagged objects to choose a slide within a large number of slides (in such case, each tagged object selects for display a particular slide within a set of slides, rather than identifying an entire set of slides from which individual slides are then chosen for display), because the continuous control capability of a haptic interface device enables a single interface device to be used, as opposed to the large number of tagged objects that would otherwise have to be used as a result of the discrete nature of tagged objects. On the other hand, when, as in the system 600, it is desired to display slides from each of multiple sets of multiple slides, the use of a haptic interface device to select both the set of slides and a slide within a set of slides may be unwieldy (e.g., it may be necessary to move sequentially through each slide of a number of sets of slides before reaching the desired slide). Further, the use of tagged objects to effect zoom control, as discussed above, can also be useful in the system 600 if the number of slides relative to the maximum distance of travel of the handle 601a is sufficiently large to render sufficiently fine control, even via a haptic interface device, difficult to achieve. Combining a tagged object with a haptic interface device, in accordance with the invention, produces a manual interface that alleviates both of the above-identified problems that may arise with an interface in which either the haptic interface device or the tagged object is used alone.

Figure 7:
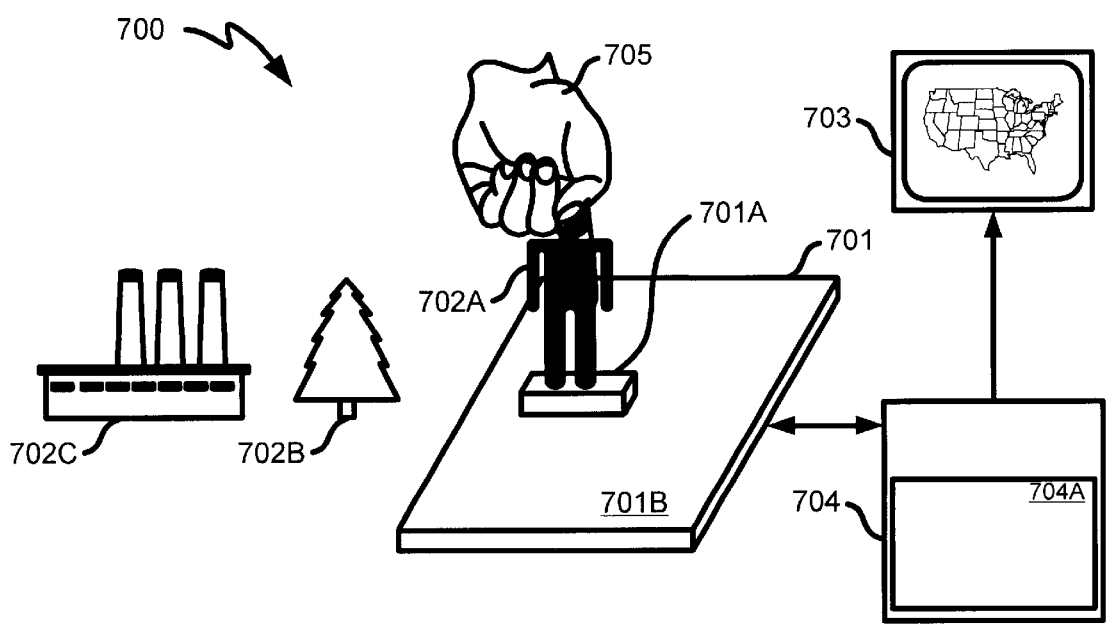
FIG. 7 is a diagram of still another exemplary embodiment of a system according to the invention.

FIG. 7 is a diagram of still another exemplary embodiment of a system according to the invention. In FIG. 7, a cartographic display system 700 is illustrated. A haptic interface device 701, together with one of a set of tagged objects 702a, 702b or 702c, enables a user 705 to display a set of cartographically-based information on a visual display device 703. As used here, a set of cartographically-based information is information concerning a characteristic or characteristics of a geographic region that can vary with location within the geographic region. As illustrated in FIG. 7, the haptic interface device 701 includes a handle mount 701a that the user 705 can slide over a platform 701b to specify a location within a geographic region. The haptic interface device 701 (under control of a computer 704) can be, for example, a force feedback device that provides a force to the user 705 in response to the nature of the cartographically-based information at locations within the geographic region traversed by the handle mount 701a. The force feedback device can be implemented using, for example, commercially available devices that can provide two-dimensional (i.e., in the plane of the platform 701b) or three-dimensional (i.e., two dimensions in the plane of the platform 701b and one perpendicular to the platform 701b) force feedback, as known to those skilled in the art. For example, a set of cartographically-based information could be the quantity of a particular thing within a geographic region, and the haptic interface device 701 could change the force applied to the handle mount 701a to produce a sensation of changing viscosity during movement of the handle mount 701a, in accordance with changes in the quantity of the thing as the geographic region is traversed (e.g., the viscosity increases as the quantity increases and vice versa).

A database 704a is stored by the computer 704. The database 704a includes multiple sets of data, each of which can represent a corresponding set of cartographically-based information for a geographic region and the haptic sensations to be associated therewith. Each of the tagged objects 702a, 702b or 702c can correspond to a particular set of data or a type of set of data (e.g., data for a particular geographic region, data representing the quantity of a particular thing). For example, as illustrated in FIG. 7, the tagged object 702a can correspond to a set of data representing population density within a particular geographic region, the tagged object 702b can correspond to a set of data representing pollution levels within that same geographic region, and the tagged object 702c can correspond to a set of data representing quantities of particular plants within the geographic region. (As indicated above and discussed further below, tagged objects for use with the system 700 can also represent a particular geographic region.) Further, the physical characteristics of each tagged object 702a, 702b or 702c can be established so that the appearance of each tagged object 702a, 702b or 702c is a representation of the cartographically-based information to which the tagged object 702a, 702b or 702c corresponds (i.e., the tagged objects 702a, 702b and 702c can be phicons). (Like the drawing system 500 of FIG. 5, the cartographic display system 700 is an example of an application of the invention in which it is particularly advantageous to use discrete selectors having physical distinctiveness—in particular, physical distinctiveness which viscerally and/or intuitively conveys a function or functions of the discrete selectors—and, perhaps, non-reassignable identities.) One of the tagged objects 702a, 702b or 702c can be connected to the haptic interface device 701 by, for example, mounting the tagged object 702a, 702b or 702c in a receptacle of the handle mount 701a of the haptic interface device 701. (In FIG. 7, the tagged object 702a is connected to the haptic interface device 701.) Each tagged object 702a, 702b or 702c includes an electronic identification device (or can otherwise communicate the identity of the tagged object 702a, 702b and 702c) that, when the tagged object 702a, 702b or 702c is connected to the haptic interface device 701, enables communication of the identity of the tagged object 702a, 702b or 702c to the computer 704 (either directly or indirectly), so that corresponding cartographically-based information is displayed on the visual display device 703 and a corresponding haptic sensation is produced by the haptic interface device 701.

The cartographic display system 700 is another example of an application of the invention in which it can be particularly advantageous to implement a manual interface according to the invention so that multiple discrete selectors can be used simultaneously. For example, when the tagged objects 702a, 702b and 702c represent the quantity of a thing within a geographic region, a second tagged object could be connected to the haptic interface device 701 to specify a particular geographic region for which the quantity of a thing is to be displayed.

Figure 8A:
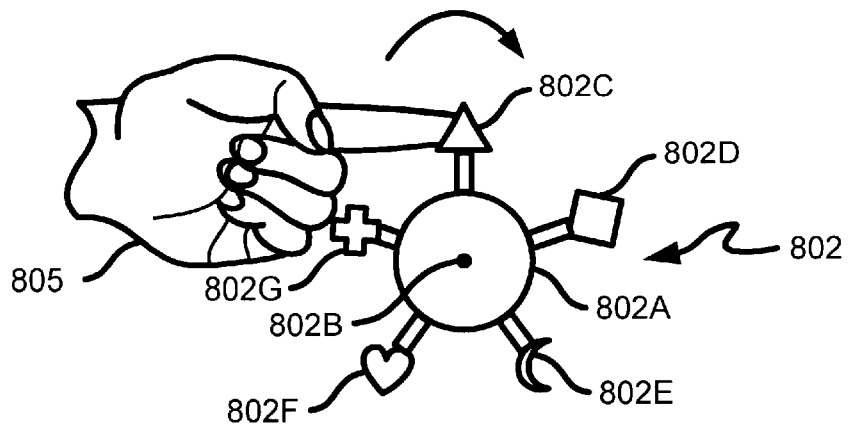
FIGS. 8A, 8B and 8C are diagrams of a manual interface device according to yet another embodiment of the invention.
Figure 8B:
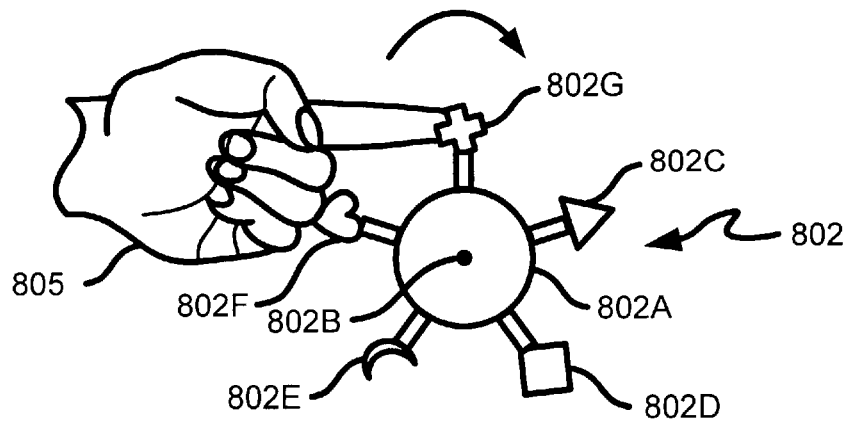
Figure 8C:
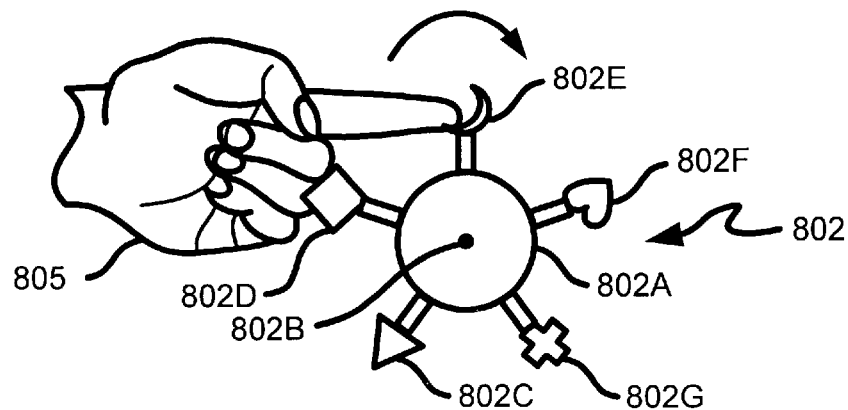

FIGS. 8A, 8B and 8C are diagrams of a discrete selector 802 for use in a manual interface device or system according to yet another embodiment of the invention. The discrete controller 802 can be used with, for example, a media (visual, audio or audiovisual) controller system. The discrete selector 802 includes multiple handles 802c through 802g that are mounted or attached to a base 802a. (The discrete selector 802 can be implemented so that handles 802c through 802g are either permanently attached or are removably connectable to the base 802a; similarly, the discrete selector 802 can be either removably connectable or permanently attached to another component of a manual interface device or system according to the invention.) The base 802a is attached to a shaft 802b that is mounted to allow rotation of the shaft 802b (and, thus, the discrete selector 802). A user 805 can interact with the media by grasping one of the handles 802c through 802g and rotating the discrete selector 802. The discrete selector 802 is implemented so that grasping one of the handles 802c through 802g (or connecting one of the handles 802c through 802g if the handles 802c through 802g are adapted to be removably connectable) activates a state of the discrete selector 802 associated with that handle and modifies the user interaction with the media in a corresponding way. (Exemplary types of modification of the user interaction are described further below.) As illustrated in FIGS. 8A, 8B and 8C, the handles 802c through 802g are physically distinctive (i.e., have a distinctive shape) so that the user 805 can readily identify which of the handles 802c through 802g to use for a desired purpose. However, one or more of the handles 802c through 802g could be made distinctive in another way (either physically distinctive or having distinctive location) or generic. Further, the identity or state associated with each of the handles 802c through 802g can be made fixed or reassignable.

A haptic interface device (not shown in FIGS. 8A, 8B and 8C) can be coupled to the shaft 802b to enable a rotational and/or translational force (haptic display) to be applied to the shaft 802b in response to interaction by the user 805 with the media. Thus, the user 805 feels the haptic display through the selected one of the handles 802c through 802g of the discrete selector 802. The type of haptic display varies in accordance with the selected handle 802c through 802g.

For example, the handle 802c can be used to select an audiovisual clip from a library of such clips. The haptic interface device can apply a force in opposition to rotation of the shaft 802b to simulate a detent as a change is made from one clip to another or from one description or identification (e.g., summary, textual description, thumbnail) of a clip to another. The handle 802d can be used, for example, to select one of multiple television channels. The haptic interface device can apply a force in opposition to rotation of the shaft 802b to simulate a detent as a change is made from one channel to another. Further, the strength of the detent may be related to the frequency with which the channels have been selected in the past (e.g., switching from a current channel to a less frequently watched channel may result in a stronger detent than would switching to a more frequently watched channel). The handle 802e can be used, for example, to browse through a movie or other video program. The haptic interface device can simulate detents between scenes and/or texture changes according to a determined level of action within the video program. The haptic interface device could also produce a haptic display in a manner similar to that discussed above with respect to the video editing and/or navigation system 400 of FIG. 4. Or, the haptic interface device could produce a haptic display as described in the commonly owned, co-pending U.S. patent application Ser. No. 09/344,327, entitled "Haptic Interface Including Clutch Control," filed on Jun. 24, 1995, by Robert S. Shaw et al. The handle 802g can be used, for example, to change the volume of the audio. The haptic interface device can change the force applied to the shaft 802b to produce a sensation of changing viscosity of the rotation of the discrete selector 802 in response to increases or decreases in the audio volume.

Implementing a manual interface device including a discrete selector as in FIGS. 8A, 8B and 8C so that the handles 802c through 802g are permanently attached can be desirable because the likelihood of losing one or more of the handles is reduced. Permanent attachment of the handles 802c through 802g may also make it easier to effect selection of one of the handles 802c through 802g, since the handles 802c through 802g are always present as part of the manual interface device (using discrete selectors that are separate devices necessitates that a user retrieve a discrete selector, which may not be readily available, to effect selection of that discrete selector).

Figure 9:
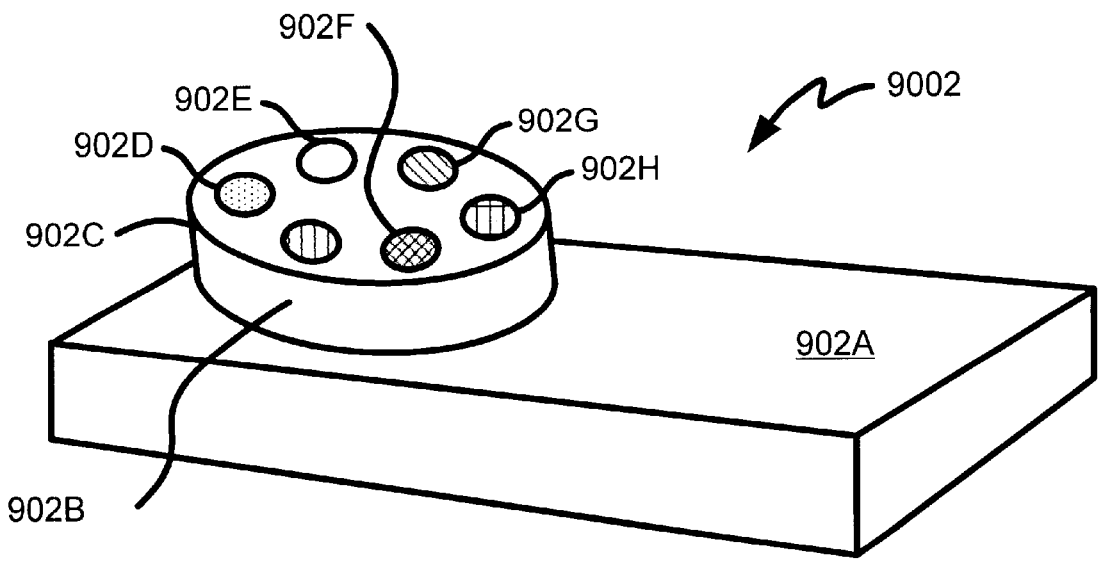
FIG. 9 is a perspective view of a discrete selector for use in a manual interface device or system according to still another embodiment of the invention.

FIG. 9 is a perpsective view of a discrete selector 902 for use in a manual interface device or system according to still another embodiment of the invention. A dial 902b is rotatably mounted on a base 902a. Selection mechanisms 902c through 902h are formed on the dial 902b. As depicted in FIG. 9, the selection mechanisms 902c through 902h can be embodied by, for example, pushbuttons or touch-sensitive surfaces. Each of the selection mechanisms 902c through 902h is formed with a surface that is textured in a way that is different from the texturing of the surfaces of any of the other selection mechanisms 902c through 902h. As depicted in FIG. 9, typically the selection mechanisms 902c through 902h are formed integrally with, or permanently attached to, the dial 902b, which provides advantages as discussed above with respect to FIGS. 8A, 8B and 8C. The texturing of the surfaces of the selection mechanisms 902c through 902h enables a user to easily identify a particular one of the seletion mechanisms 902c through 902h. This is particularly so, as is the case with selection mechanisms whose identity is conveyed to a user by the position of the selection mechanism on a discrete selector, when it is difficult or impossible for the user to see the discrete selector.

Figure 10:
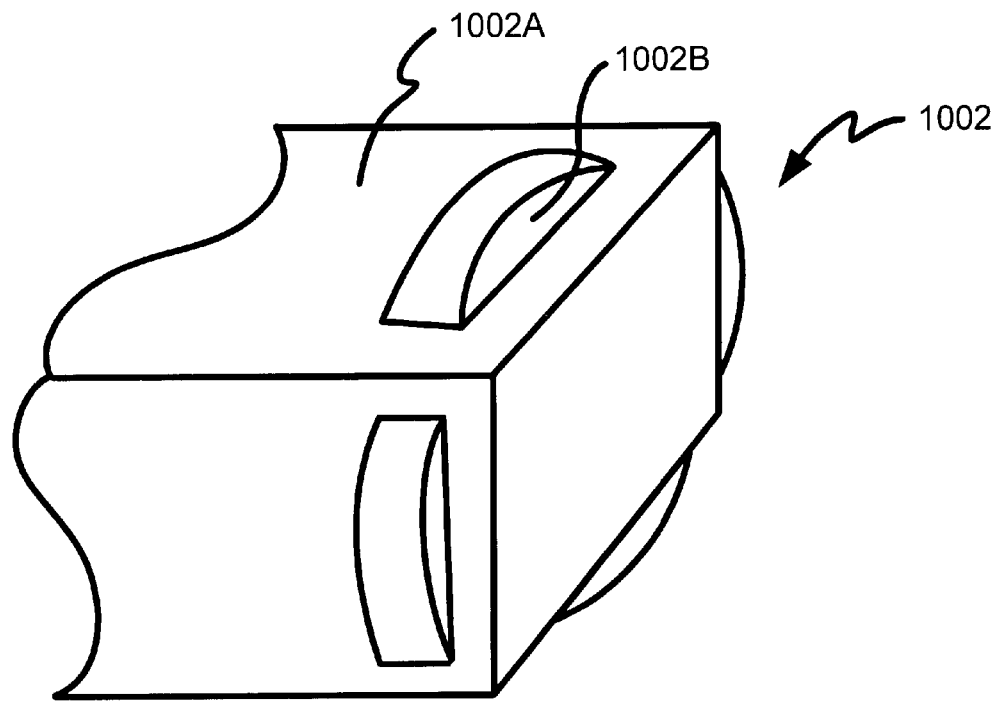
FIG. 10 is a perspective view of a discrete selector for use in a manual interface device or system according to still another embodiment of the invention.

FIG. 10 is a perspective view of a discrete selector 1002 for use in a manual interface device or system according to still another embodiment of the invention. A wheel 1002b is rotatably mounted within a base 1002a. The wheel 1002b is mounted within the base 1002a such that four regions are defined near the periphery of the wheel 1002b. Contact by the user with one of the four defined regions selects a particular modification of the user interaction with the environment. In this embodiment, as discussed further above, each selection mechanism is identified by the location of the selection mechanism on the discrete selector 1002.

Various embodiments of the Invention have been described. The descriptions are intended to be illustrative, not limitative. Thus, it will be apparent to one skilled in the art that certain modifications may be made to the invention as described herein without departing from the scope of the claims set out below.

We claim:

1. A manual interface device for enabling an interaction between a person and an environment, comprising:
    a haptic interface device for providing a haptic sensation to the person in response to interaction with the environment; and
    a discrete selector that affects the interaction of the person with the environment in accordance with an identity of state of the discrete selector, wherein the discrete selector is removably connectable to the haptic interface device;
    wherein the discrete selector comprises a base on which a plurality of selection mechanisms are mounted or attached, each selection mechanism affecting the interaction of the person with the environment in accordance with an identity or state of the selection mechanism.

2. A manual interface device for enabling an interaction between a person and an environment, rising:
    a haptic interface device for providing a haptic sensation to the person in response to interaction with the environment;
    a discrete selector that affects the interaction of the person with the environment in accordance with an identity of state of the discrete selector, wherein the discrete selector is removably connectable to the haptic interface device;
    an apparatus for representing the environment;
    means for communicating between the haptic interface device and the apparataus;
    means for filtering communication between the haptic interface device and the apparatus; and
    means for communicating between the discrete selector to the means for filtering causes the means for filtering to modify communication between the haptic interface device and the apparatus so as to affect the interaction of the person with the environment in accordance with the identity or state of the discrete selector;
    wherein:
        the discrete selector has a distinctive appearance that corresponds to an identity or state of the discrete selector; and
        the means for communicating between the discrete selector and the means for filtering further comprises a vision recognition system for identifying the distinctive appearance of a discrete selector.

3. A manual interface device for enabling an interaction between a person and an environment, comprising:
    a haptic interface device for providing a haptic sensation to the person in response to interaction with the environment; and
    a discrete selector that affects the interaction of the person with the environment in accordance with an identity or state of the discrete selector, wherein the discrete selector has a distinctive shape, texture, size, color and/or location that corresponds to an identity or state of the discrete selector;
    wherein the discrete selector comprises a base on which a plurality of selection mechanisms are mounted or attached, wherein each selection mechanism affects the interaction of the person with the environment in accordance with an identity or state of the selection mechanism, wherein one or more of the selection mechanisms has a distinctive shape, texture, size and/or color that corresponds to an identity or state of the selection mechanism.

4. A manual interface device as in claim 3, wherein a plurality of selection mechanisms have a distinctive shape, texture, size and/or color that corresponds to an identity or state of the selection mechanism.

5. A manual interface device for enabling an interaction between a person and an environment, comprising:
    a haptic interface device for providing a haptic sensation to the person in response to interaction with the environment; and
    a discrete selector that affects the interaction of the person with the environment in accordance with an identity or state of the discrete selector, wherein the discrete selector has a physical distinctiveness that corresponds to an identity or state of the discrete selector, and wherein the haptic sensation is provided to the person through the discrete selector;
    wherein the discrete selector comprises a base on which a plurality of selection mechanisms are mounted or attached, wherein each selection mechanism affects the interaction of the person with the environment in accordance with an identity or state of the selection mechanism, and wherein one or more of the selection mechanisms has a physical distinctiveness.

6. A manual interface device as in claim 5, wherein a plurality of selection mechanisms have a physical distinctiveness that corresponds to an identity or state of the selection mechanism.

7. A manual interface device for enabling an interaction between a person and an environment, comprising:

a haptic interface device for providing a haptic sensation to the person in response to interaction with the environment;

a discrete selector that affects the interaction of the person with the environment in accordance with an identity or state of the discrete selector, wherein the discrete selector has a physical distinctiveness that corresponds to an identity or state of the discrete selector, and wherein the haptic sensation is provided to the person through the discrete selector;

an apparatus for representing the environment;

means for communicating between the haptic interface device and the apparatus;

means for filtering communication between the haptic interface device and the apparatus; and means for communicating the discrete selector and the means for filtering, wherein communication of an identity or state of the discrete selector to the means for filtering causes the means for filtering to modify communication between the haptic interface device and the apparatus so as to affect the interaction of the person with the environment in accordance with the identity or state of the discrete selector;

wherein:

the discrete selector has a distinctive appearance that corresponds to an identity or state of the discrete selector; and;

the means for communicating between the discrete selector and the means for filtering further comprises a vision recognition system for identifying the distinctive appearance of a discrete selector.

8. A manual interface device for enabling an interaction between a person and an environment, comprising:

a haptic interface device for providing a haptic sensation to the person in response to interaction with the environment; and a discrete selector comprising a base on which a plurality of selection mechanisms are mounted or attached, wherein each selection mechanism affects the interaction of the person with the environment in accordance with an identity or state of the selection mechanism, and wherein the haptic sensation is provided to the person through the selected selection mechanism.

9. A manual interface device as in claim 8, wherein the haptic interface device is a force feedback interface device.

10. A manual interface device as in claim 8, wherein the haptic interface device is a tactile interface device.

* * * * *